US011055911B1

(12) United States Patent
Padovani et al.

(10) Patent No.: US 11,055,911 B1
(45) Date of Patent: Jul. 6, 2021

(54) METHOD OF GENERATING SURFACE DEFINITIONS USABLE IN COMPUTER-GENERATED IMAGERY TO INCLUDE PROCEDURALLY-GENERATED MICRODETAIL

(71) Applicant: Weta Digital Limited, Wellington (NZ)

(72) Inventors: Emiliano Padovani, Wellington (NZ); Artur Vill, Wellington (NZ)

(73) Assignee: Weta Digital Limited, Wellington (NZ)

( * ) Notice: Subject to any disclaimer, the term of this patent is extended or adjusted under 35 U.S.C. 154(b) by 0 days.

(21) Appl. No.: 17/151,913

(22) Filed: Jan. 19, 2021

Related U.S. Application Data

(63) Continuation of application No. 17/035,522, filed on Sep. 28, 2020.

(60) Provisional application No. 62/968,014, filed on Jan. 30, 2020.

(51) Int. Cl.
*G06T 17/20* (2006.01)
*G06T 13/40* (2011.01)

(52) U.S. Cl.
CPC ............... *G06T 17/20* (2013.01); *G06T 13/40* (2013.01)

(58) Field of Classification Search
CPC ......... G06T 17/20; G06T 13/40; G06T 19/20; G06T 19/006; G06T 15/04; G06T 2207/30201; G06T 17/00; G06T 19/00; G06T 2207/30196
See application file for complete search history.

(56) References Cited

U.S. PATENT DOCUMENTS

| | | | | |
|---|---|---|---|---|
| 2007/0229498 | A1* | 10/2007 | Matusik | G06T 17/20 345/420 |
| 2012/0313937 | A1* | 12/2012 | Beeler | H04N 13/261 345/419 |
| 2016/0140750 | A1* | 5/2016 | Pai | G06T 15/08 345/420 |
| 2016/0267705 | A1* | 9/2016 | O'Leary | G06T 13/20 |

FOREIGN PATENT DOCUMENTS

JP 5950335 B2 * 7/2016

OTHER PUBLICATIONS

Bando et al., A simple method for modeling wrinkles on human skin, Proceedings of the 10th Pacific Conference on Computer Graphics and Applications, 2002.
Zhang et al., Realistic and efficient wrinkle simulation using an anatomy-based face model with adaptive refinement, Proceedings of Computer Graphics International, 2005.

(Continued)

*Primary Examiner* — Maurice L. McDowell, Jr.
(74) *Attorney, Agent, or Firm* — Haynes & Boone, LLP; Philip H. Albert

(57) ABSTRACT

A computer-implemented method and system for modeling an outer surface, such as skin. The method includes, under the control of one or more computer systems configured with executable instructions, defining a plurality of microstructures such as microstructures to be displayed in microstructure locations on a geometric model of a character or inanimate object, and generating a volumetric mesh including the plurality of microstructures. The volumetric mesh is configured to be applied to the geometric model as an outer surface (e.g., skin) covering the geometric model.

20 Claims, 10 Drawing Sheets

(56) References Cited

OTHER PUBLICATIONS

Cutler, et al., An art-directed wrinkle system for CG character clothing and skin, Science Direct, Graphical Models 69, 2007.
Volino, et al., Fast geometrical wrinkles on animated surfaces, MIRAlab, University of Geneva, CH-1211, Switzerland, 1999.
International search report of International Application No. PCT/NZ2020/050118 filed Oct. 2, 2020.
Fisher, et al., DiagSplit: Parallel, crack-free, adaptive tessellation of micropolygon rendering, ACM Transactions on Graphics, vol. 28, No. 5, Article 150, 2009.

* cited by examiner

METHOD OF GENERATING SURFACE DEFINITIONS USABLE IN COMPUTER-GENERATED IMAGERY TO INCLUDE PROCEDURALLY-GENERATED MICRODETAIL

CROSS-REFERENCES TO PRIORITY AND RELATED APPLICATIONS

The present application is a Continuation of U.S. patent application Ser. No. 17/035,522 filed Sep. 28, 2020, which claims the benefit of, and priority from, U.S. Provisional Patent Application No. 62/968,14 filed Jan. 30, 2020, both entitled "Method of Inferring Microdetail on Skin Animation."

The entire disclosure of the applications recited above are hereby incorporated by reference, as if set forth in full in this document, for all purposes.

FIELD OF THE INVENTION

The present disclosure generally relates to methods and systems for generating realistic computer-animated outer surfaces, such as simulated skin, that covers at least a portion of an animated character. The disclosure relates more particularly to apparatus and techniques for using procedural modeling to model microstructures of the outer surface and optimize geometry for finite-element simulation of the microstructures.

BACKGROUND

Many industries generate or use realistic computer-animated characters. For example, a feature film creator might want to generate a computer-animated duplicate of a human actor for use in visual presentations as part of the feature film. Human beings have skin that includes microstructures, such as pores, freckles, pimples, and micro-wrinkles, that are too small to be easily captured using currently available scanning technologies. These microstructures may be visible or are expected to be present in an animated sequence, which means that the microstructures might be desired in the computer-animated duplicate or audiences will be able to quickly distinguish between the actor and the computer-animated duplicate. While some microstructures can be included in textures applied to the computer-animated duplicate, this technique limits an artist's control over the appearance of the computer-animated character.

In some instances, the microstructures change shape during motion, making it difficult or impossible to represent them with conventional texture-based displacement mapping techniques.

SUMMARY

An embodiment includes a computer-implemented method of modeling an outer surface. The method includes, under the control of one or more computer systems configured with executable instructions, performing at least one procedural modeling process that defines a plurality of microstructures to be displayed in pore microstructure on a geometric model, and generating an adaptive mesh including the plurality of microstructures. The adaptive mesh has a resolution determined, at least in part, by the microstructure locations of the plurality of microstructures. A volumetric mesh can be generated that is representable in computer memory by a data structure defining a mesh surface and a depth or thickness value at each of a plurality of points on the mesh surface. The volumetric mesh can then be applied to the geometric model as an outer surface covering the geometric model, possibly with varying depths, indicated by thickness values of the volumetric mesh. The method can be used with microstructures other than pores.

Another embodiment includes a computer-implemented method of modeling skin. The method includes, under the control of one or more computer systems configured with executable instructions, obtaining a geometric model of at least a portion of a character, obtaining microstructure parameter values, generating microstructure locations based, at least in part, on a first set of the microstructure parameter values, generating an intermediate mesh by generating microstructures at the microstructure locations, and generating a volumetric mesh including the microstructures. The volumetric mesh is configured to be applied to the geometric model as skin covering the portion of the character. The geometric model includes an initial mesh defined by a first number of polygons. The intermediate mesh includes a second number of polygons. The second number of polygons is greater than the first number of polygons. The second number of polygons is determined, at least in part, by the microstructure locations. An appearance of the microstructures is based, at least in part, on a second set of the microstructure parameter values.

Yet another embodiment includes a system that includes at least one first computing device configured to implement a grooming processor and at least one second computing device configured to implement a mesh modeler. The grooming processor is configured to receive a three-dimensional geometric model and microstructure parameter values, generate microstructure locations based, at least in part, on a first portion of the microstructure parameter values, generate an adaptive mesh that includes microstructures positioned at the microstructure locations, and send coarse grooming geometry to the mesh modeler. The coarse grooming geometry includes the adaptive mesh, the three-dimensional geometric model, and a second set of the microstructure parameter values. The mesh modeler is configured to generate a volumetric mesh based on the coarse grooming geometry. The volumetric mesh is configured to cover the three-dimensional geometric model.

BRIEF DESCRIPTION OF THE DRAWINGS

Various embodiments in accordance with the present disclosure will be described with reference to the drawings, in which.

DETAILED DESCRIPTION

Figure 1:
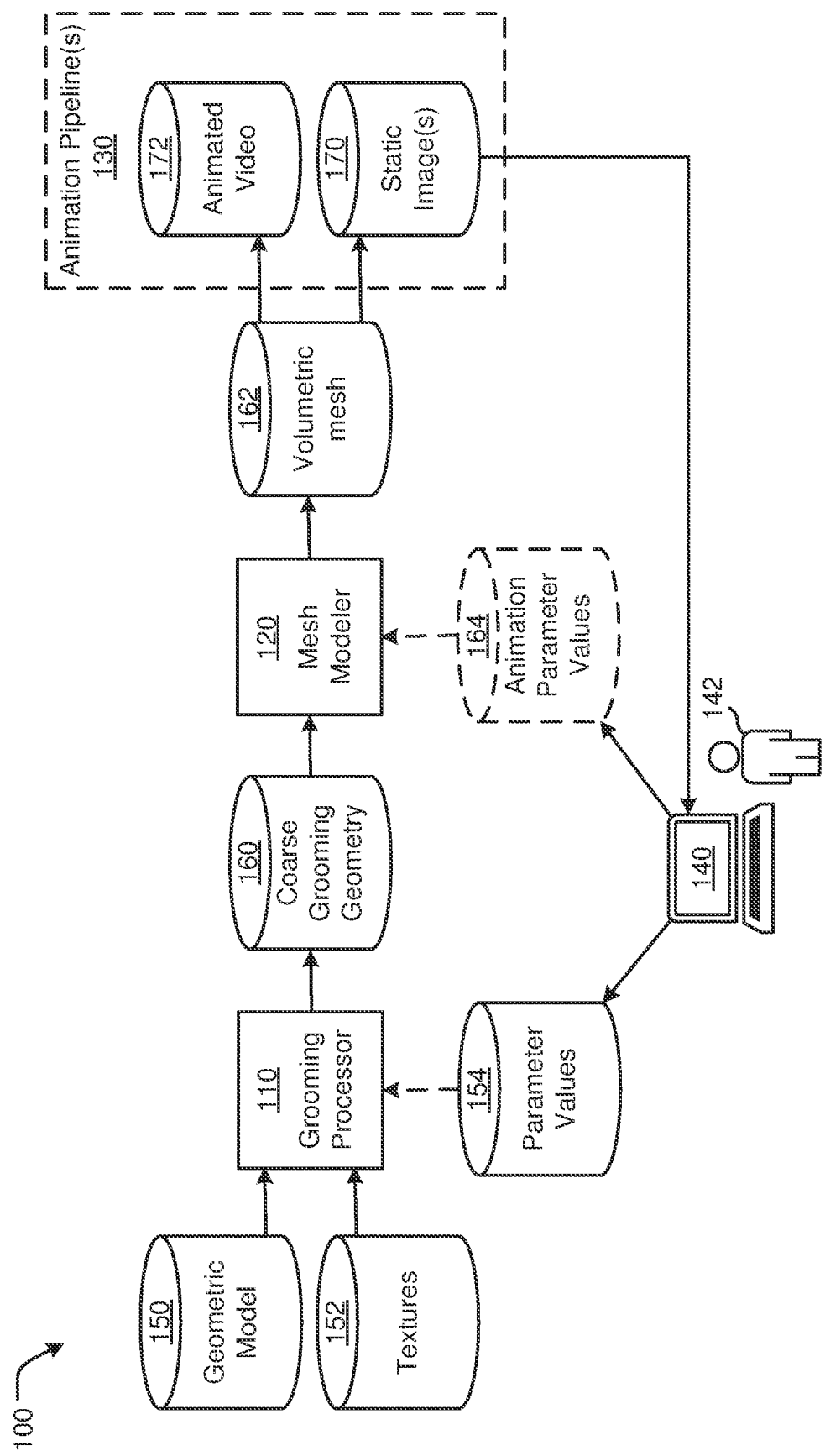
FIG. 1 is a diagram of a data flow through a system when the system is performing a process illustrated in FIG. 2 or 3, or as otherwise described herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a computer simulation involving three dimensions and having an output that is imagery (such as a still image or a sequence of video frames), often the virtual objects and material being simulated are represented relative to a three-dimensional ("3D") grid in a virtual space with the grid being divided into voxels. Some elements might have sub-voxel resolution.

In many of the examples described herein, inputs to a computer simulation system include parameters about the virtual material/object/fluid/etc. being simulated and an output of a computer simulation are the positions/mass/movement/etc. of the virtual material/object/fluid/etc. Such an output might be an input to an animation system, which can provide for rendering computer-generated imagery of the virtual material/object/fluid/etc. present in a scene in a virtual space. The computer-generated imagery might be still images, stereoscopic images, video sequences, and/or stereoscopic video sequences. In some cases, the computer simulation of virtual elements seeks to match what would happen with corresponding real-world elements, but in other cases, artistic or other inputs are used in the computer simulation to create effects that do not correspond to anything in the real-world, or at least anything in available physical environments. For example, in a given simulation, an operator of a simulation engine might provide an input that corresponds to gravity "turning off" for a short period of time, which can be simulated but has no real-world correspondence.

The term "microstructure" is used herein to describe synthetic skin detail and microdetail including but not limited to pores, micro-wrinkles, and the like. A skin of an object or character might visually be something a viewer would not consider to be skin, but it should be understood that techniques described herein with reference to a character's skin can also be used for outer surfaces that cover characters that are not normally thought of as character skin, as well as outer surfaces of other objects not normally thought of as characters, as might be the case for a feature film or other video project with a subject matter that borrows from the real world but has things that do not occur in reality.

The term "procedural model" refers to a model created using procedural modeling.

The term "procedural modeling" describes techniques used in computer graphics to create 3D models and textures based on one or more sets of rules. A model is representable by one or more data structures that can be processed by a computer animation system to generate visual elements or effects that include a representation of an object, such as a character, in a visual presentation. For example, a computer animation system might read in a model data structure from computer memory and process that model data structure to generate imagery (e.g., a single still image or a sequence of images forming a video sequence) that illustrates the object being modeled by the model. In a specific example, if the model is of an articulated character with rigging corresponding to human bones and joints and includes human skin, the imagery might be of a simulated person with simulated skin walking about in a scene space that might include other objects.

FIG. 1 is a diagram of a data flow through a system 100 when system 100 is performing a process 200 (see FIG. 2) that generates computer-animated skin for a 3D computer-animated character. The character may be a synthetic representation of a living person (e.g., an actor), a completely synthetic or artist-created character, and the like. The skin may be facial skin or skin located elsewhere on the character's body. Alternatively, the skin may be an outer covering or surface of an inanimate object. Process 200 (see FIG. 2) uses procedural modeling to generate microstructures for the computer-animated skin. In other words, system 100 can be configured to create a procedural model of the microstructures that system 100 uses to model the character's skin.

Figure 4:
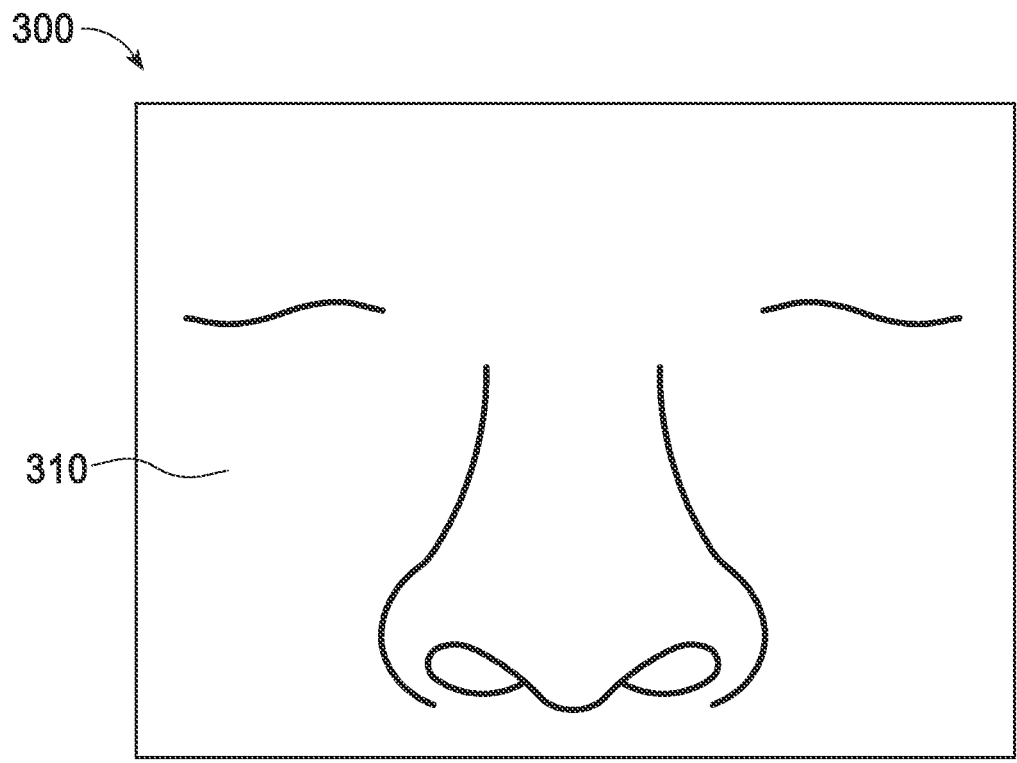
FIG. 4 illustrates a portion of an example geometric model covered by an initial skin.

System 100 is shown including a grooming processor 110, a mesh modeler 120, one or more rendering or animation pipelines 130, and at least one client computing device 140 operated by at least one human artist 142. Grooming processor 110 may be implemented by software executing on a computer system (e.g., a computer system 1500 illustrated in FIG. 15). The software may include Houdini™ software tools developed by SideFx, Maya™ software tools developed by Autodesk Inc., and the like. Grooming might be generally a process whereby curves are defined over a surface. In a specific grooming operation, data representing a surface is provided to a computer process, along with parameters and possibly also procedural details, and the computer process outputs data representing curves along the surface that satisfy certain constraints and are consistent with the parameters and procedural details. In some implementations, curves are represented by piecewise linear curves, such as an ordered list of vertices in 2D or 3D coordinate systems.

grooming processor 110 is configured to receive a 3D geometric model 150 of a character, textures 152, and microstructure parameter values 154 as input. For ease of illustration, 3D geometric model 150 is described as depicting a character. However, 3D geometric model 150 may alternatively depict an inanimate object and such embodiments are within the scope of the present teachings. FIG. 4 illustrates a portion of an example geometric model 300.

Figure 5:
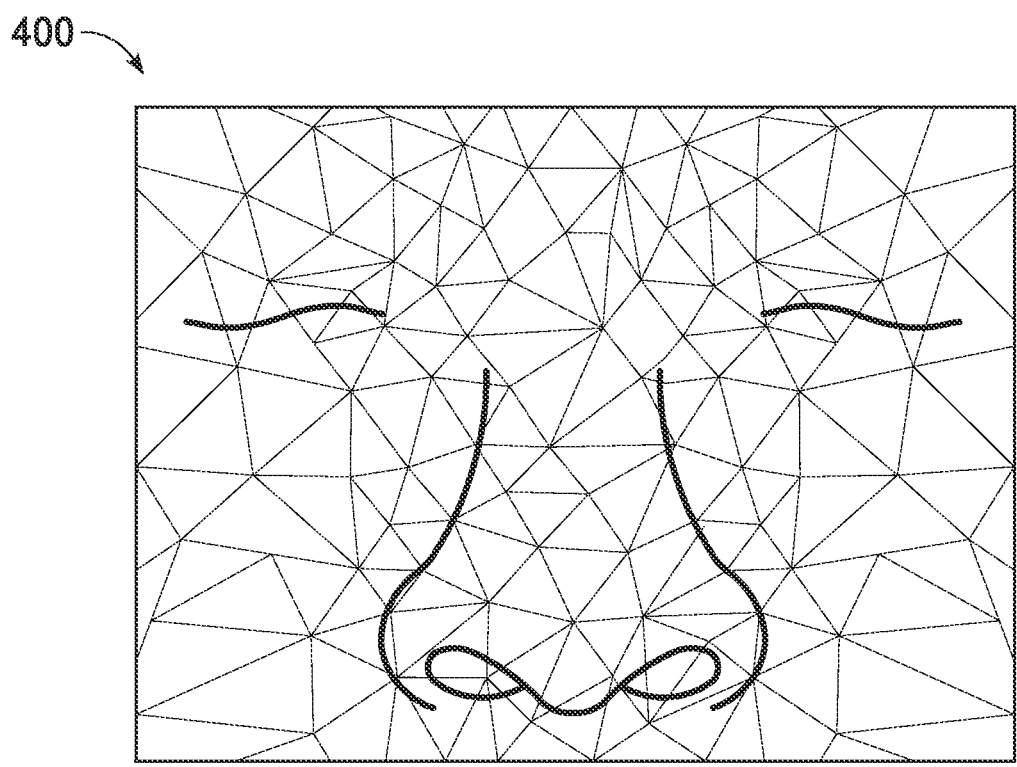
FIG. 5 illustrates a portion of an example initial mesh defined in 3D space by two-dimensional polygons that is blended or smoothed to define the initial skin.

Referring to FIG. 1, geometric model 150 may be obtained by scanning a real-world physical model, such as a human actor. Alternatively, geometric model 150 may be obtained from an artist (e.g., artist 142) who generated geometric model 150 using a 3D modeling program (not shown). In other embodiments, the artist inputs are generated by another computer program. Geometric model 150 may lacks at least some details with respect to the structure of the skin. Instead, geometric model 150 defines the rough geometry of the face (e.g., face shape and major wrinkles) covered by an initial mesh 400 (see FIGS. 5 and 10) that lacks a high enough resolution to include microstructures (e.g., pores, freckle, pimples, and micro-wrinkles). Referring to FIG. 5, initial mesh 400 can be defined in 3D space by two-dimensional polygons, typically triangles. Initial mesh 400 may be blended or smoothed to define an outer surface 310 (see FIG. 4) of an initial skin that may lack microstructures.

Referring to FIG. 1, textures 152 include skin coloration but not shape information. Textures 152 may also include other skin features, such as moles, pimples, rashes, freckles, deep wrinkles, scars, and the like. Textures 152 may have been hand-painted by an artist (e.g., artist 142) using a texture painting tool.

Grooming processor 110 is configured to use procedural modeling to generate the microstructures of the skin. Microstructure parameter values 154 are inputs that control appearance of microstructures generated. Thus, microstructure parameter values 154 at least partially define the location and appearance of the microstructures. By way of non-limiting examples, microstructure parameter values 154 may include one or more of the following parameter values: one or more pore density values, one or more pore depth values, one or more pore size (e.g., diameter) values, one or more pore shape values, one or more pore distribution values, and the like, for pores or other microstructures. Optionally, microstructure parameter values 154 may include different values for different portions of outer surface 310 (see FIG. 4) of the initial skin defined by initial mesh 400 (see FIGS. 5 and 10). For example, microstructure parameter values 154 may specify different pore density values for different portions of the face. One or more of microstructure parameter values 154 (e.g., the pore depth values) may each be expressed as a probability distribution, a mathematical expression, and the like.

Figure 9:
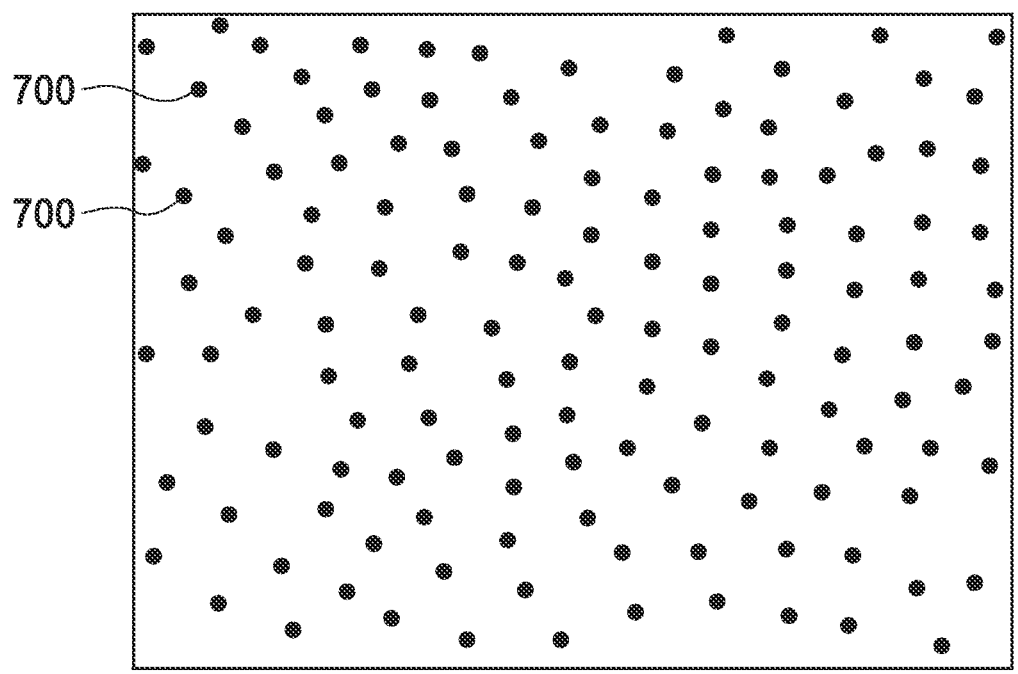
FIG. 9 illustrates an enlarged portion of FIG. 8.
Figure 10:
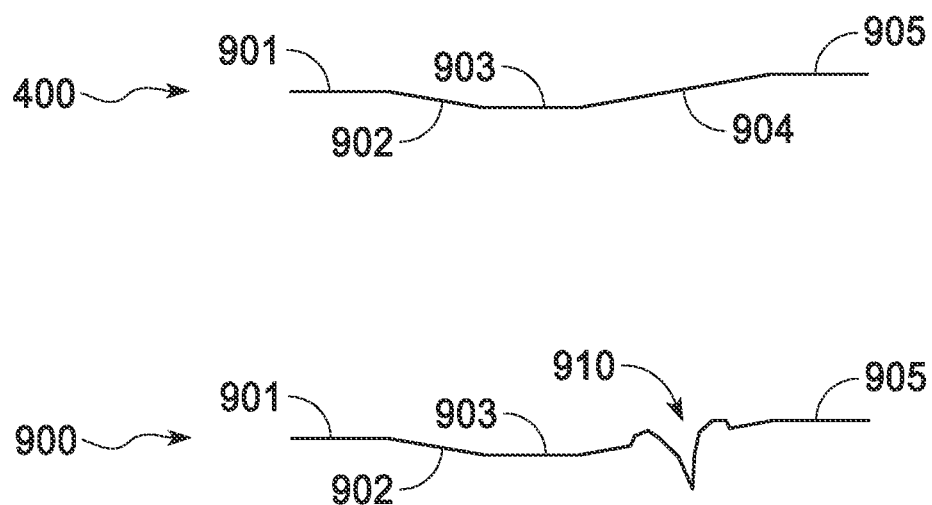
FIG. 10 is a cross-sectional view of the example initial mesh illustrated above a cross-sectional view of an example adaptive mesh.

The microstructures are separate from both textures 152 and geometric model 150 and may be characterized as being variances from geometric model 150 and/or initial mesh 400 (see FIGS. 5 and 9).

grooming processor 110 is configured to display an intermediate or adaptive mesh 900 (see FIG. 10) to artist 142 that allows artist 142 to see how the microstructures might look when fully rendered by animation pipeline(s) 130. A cross-section of an example of adaptive mesh 900 is illustrated in FIG. 10 below a cross-section of an example of initial mesh 400. Referring to FIG. 10, adaptive mesh 900 is defined in 3D space by two-dimensional polygons. Adaptive mesh 900 may be blended or smoothed to define an outer surface 1000 (see FIG. 11) of an intermediate skin that includes at least some of the microstructures. Because adaptive mesh 900 includes more detail that initial mesh 400, adaptive mesh 900 is defined by more polygons than initial mesh 400. For example, referring to FIG. 10, initial mesh 400 may include polygons 901-905. In the example illustrated, a procedural microstructure 910 is formed with an area of polygon 904. Thus, polygon 904 is divided into a number of smaller polygons that define procedural microstructure 910. But, other polygons 901-903 and 905 may remain unchanged.

Referring to FIG. 1, at this point, the microstructures may be altered (e.g., by changing one or more of microstructure parameter values 154) and adaptive mesh 900 (see FIG. 10) regenerated and displayed by grooming processor 110.

grooming processor 110 is configured to output coarse grooming geometry 160 and to send coarse grooming geometry 160 to mesh modeler 120. It should be understood that various elements being operated on, such as coarse grooming geometry 160, are stored as data that can be written to computer memory, read from computer memory, and transmitted between computer processes and/or components. Coarse grooming geometry 160 includes adaptive mesh 900 (see FIG. 10), information defining the microstructures (e.g., microstructure parameter values 154), geometric model 150, and textures 152. The information defining the microstructures may define one or more internal structure of the skin below outer surface 1000 (see FIG. 11) of the intermediate skin. For example, the information may define a location and a depth of each of the microstructures.

mesh modeler 120 is configured to receive coarse grooming geometry 160 as input and output a volumetric mesh 162 defined by 3D shapes, such as tetrahedrons. Thus, coarse grooming geometry 160 may be fed to mesh modeler 120, which generates 3D meshes and/or tessellations that include the microstructures and the internal structure(s), for use in static image generation or animation generation. The meshes and/or tessellations generated by mesh modeler 120 may be considered adaptive in that the particular detail of the meshes and/or tessellations depends upon the locations of the microstructures. In other embodiments, a mesh generation process is used that does not use or might not require meshes and/or.

volumetric mesh 162 might not have a uniform depth or thickness. Optionally, mesh modeler 120 may also receive animation parameter values 164 from client computing device 140. Animation parameter values 164 may define facial expressions, poses of the character, movement of the character, and the like. Mesh modeler 120 may be implemented by software executing on a computer system (e.g., computer system 1500 illustrated in FIG. 15). The software may include Houdini™ software tools developed by SideFx, and the like.

Animation pipeline(s) 130 is/are configured to receive volumetric mesh 162 as an input and output one or more static images 170 and/or one or more animated videos 172. Static image(s) 170 and/or animated video(s) 172 include visual representations of the 3D computer-animated character with computer-animated skin created by applying volumetric mesh 162 and textures 152 to geometric model 150.

When animation pipeline(s) 130 generates static image(s) 170, animation pipeline(s) 130 may transmit static image(s) 170 to client computing device 140 for display to artist 142. Artist 142 may use static image(s) 170 to view the 3D computer-animated character and make adjustments to microstructure parameter values 154 used to create the computer-animated skin. Then, grooming processor 110 may output a new version of coarse grooming geometry 160, which mesh modeler 120 may use to recreate volumetric mesh 162. Finally, animation pipeline(s) 130 may output new versions of static image(s) 170 and/or animated video(s) 172 that may be viewed by artist 142 on client computing device 140. This process may be repeated until artist 142 is satisfied with the appearance of the skin.

While illustrated in FIG. 1 as being separate from animation pipeline(s) 130, grooming processor 110 and/or mesh modeler 120 may be implemented as part of animation pipeline(s) 130. Animation pipeline(s) 130 may be implemented by software executing on one or more computer systems (e.g., each like computer system 1500 illustrated in FIG. 15). By way of a non-limiting example, animation pipeline(s) 130 may be implemented as a visual content generation system 1400 (see FIG. 14) described below.

As mentioned above, client computing device 140 is configured to communicate with both grooming processor 110 and mesh modeler 120. Artist 142 may use client computing device 140 to specify microstructure parameter values 154 to grooming processor 110 and/or animation parameter values 164 to mesh modeler 120. Grooming processor 110 is configured to display coarse grooming geometry 160 to artist 142 on client computing device 140 so that artist 142 may adjust microstructure parameter values 154 as desired before coarse grooming geometry 160 is input into mesh modeler 120. Mesh modeler 120 is configured to display volumetric mesh 162 to artist 142 on client computing device 140 so that artist 142 may adjust animation parameter values 164 as desired before volumetric mesh 162 is input into animation pipeline(s) 130. As mentioned above, client computing device 140 is configured to receive static image(s) 170 from animation pipeline(s) 130 and display static image(s) 170 to artist 142 so that artist 142 may adjust microstructure parameter values 154 and/or animation parameter values 164. Client computing device 140 may be implemented using computer system 1500 illustrated in FIG. 15.

Figure 2:
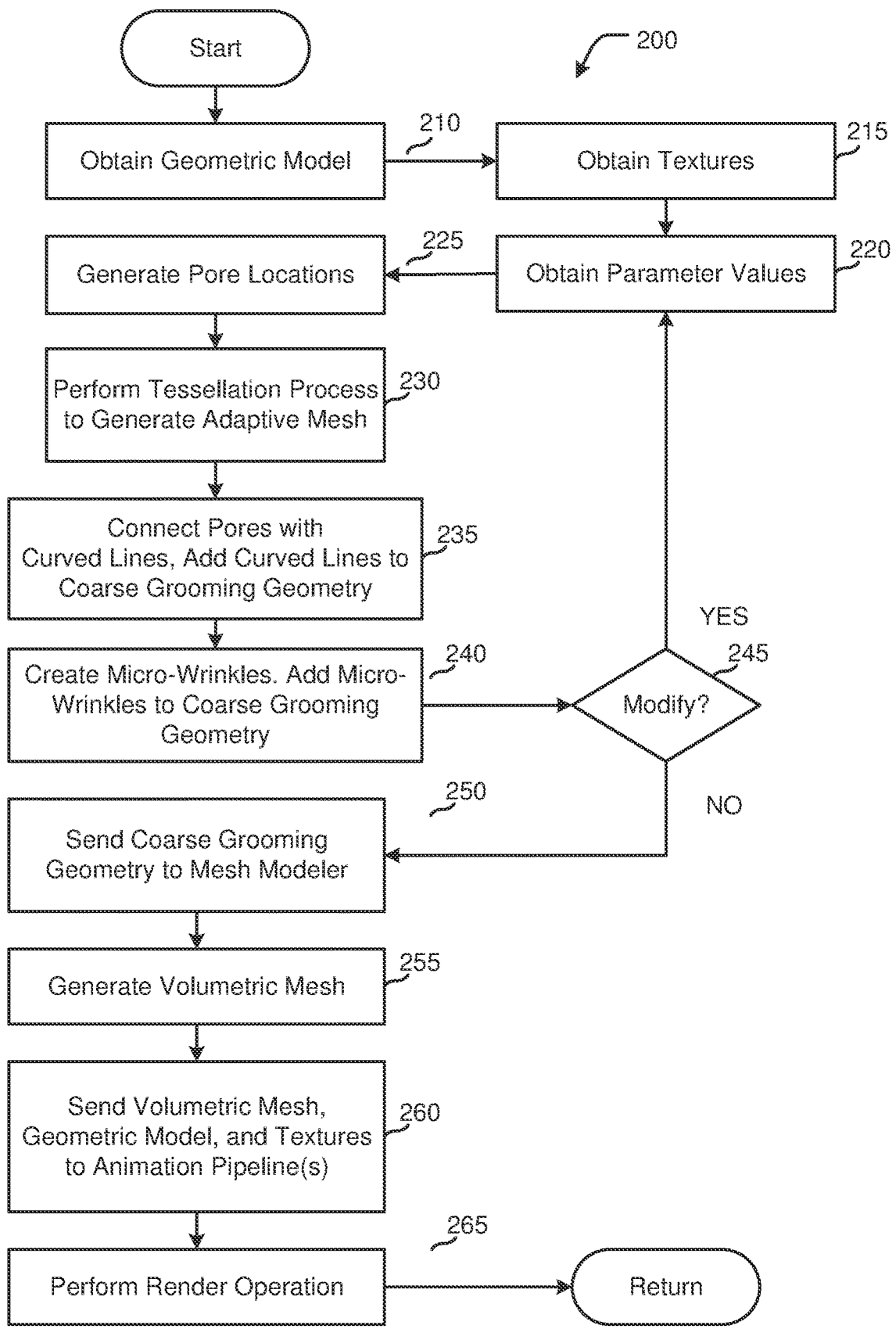
FIG. 2 is a flowchart of the process of generating computer-animated skin for a three-dimensional ("3D") computer-animated character.

FIG. 2 is a flowchart of process 200 that may be executed by system 100 of FIG. 1 and used to generate computer-animated skin for the 3D computer-animated character. Referring to FIG. 2, in a first step 210, grooming processor 110 (see FIG. 1) obtains geometric model 150 (see FIG. 1). As mentioned above, geometric model 150 is covered by initial mesh 400 (see FIGS. 5 and 10), which may be blended or smoothed to define outer surface 310 (see FIG. 4) of initial skin that may lack any microstructure. Next, at step 215, grooming processor 110 obtains textures 152 (see FIG. 1) and optionally applies them to outer surface 310 (see FIG. 4) of the initial skin.

Then, at step 220, grooming processor 110 (see FIG. 1) obtains microstructure parameter values 154 (see FIG. 1). Referring to FIG. 1, microstructure parameter values 154 may be stored by grooming processor 110 (e.g., in a file), entered by artist 142, and the like. Initially, one or more of microstructure parameter values 154 may be set to default values that may be overwritten by grooming processor 110 with values supplied by artist 142 and/or automatically generated by grooming processor 110.

Figure 6:
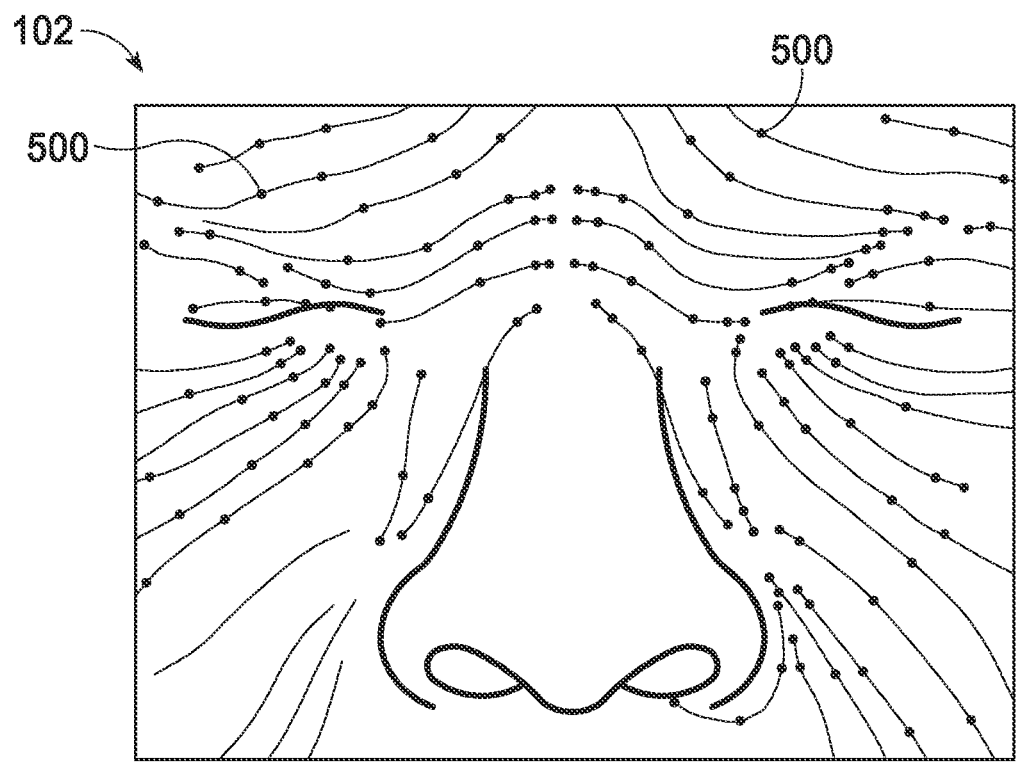
FIG. 6 illustrates flow lines drawn by an artist along an outer surface of the initial skin that a grooming processor may use to automatically generate flows.
Figure 7:
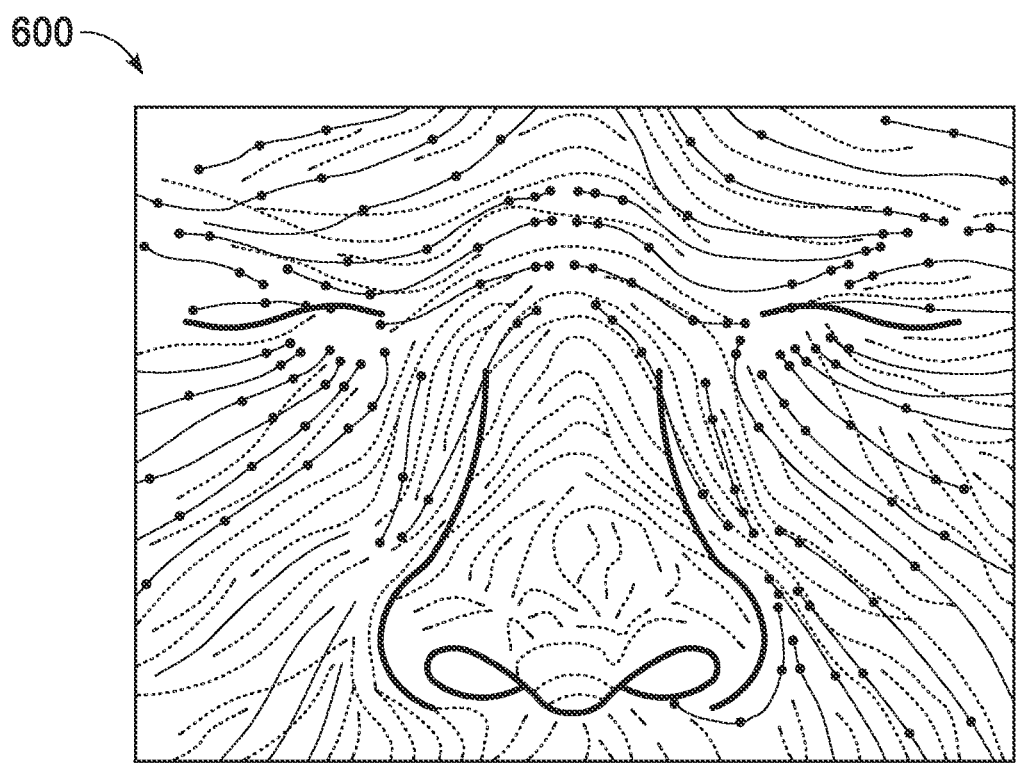
FIG. 7 illustrates flows that identify directions that micro-wrinkles may take along the outer surface of the initial skin.

Microstructure parameter values 154 may include one or more values that define flows 600 (see FIG. 7) along outer surface 310 (see FIG. 4) of the initial skin. Referring to FIG. 7, flows 600 identify directions that micro-wrinkles will take along outer surface 310 (see FIG. 4) of the initial skin. Flows 600 may be built or specified by artist 142 (see FIG. 1) using grooming processor 110 (see FIG. 1). For example, referring to FIG. 6, artist 142 may draw flow lines 500 along outer surface 310 (see FIG. 4) of the initial skin and grooming processor 110 may automatically generate flows 600 (see FIG. 7) based on flow lines 500. Referring to FIG. 1, artist 142 may also specify value(s) of one or more flow parameters that grooming processor 110 may use to generate flows 600 (see FIG. 7). By way of another non-limiting example, grooming processor 110 may automatically generate flows 600 (see FIG. 7). In such embodiments, artist 142 may manually adjust flows 600 as desired. The information (e.g., the flow parameter(s)) defining flows 600 is stored in microstructure parameter values 154.

Figure 8:
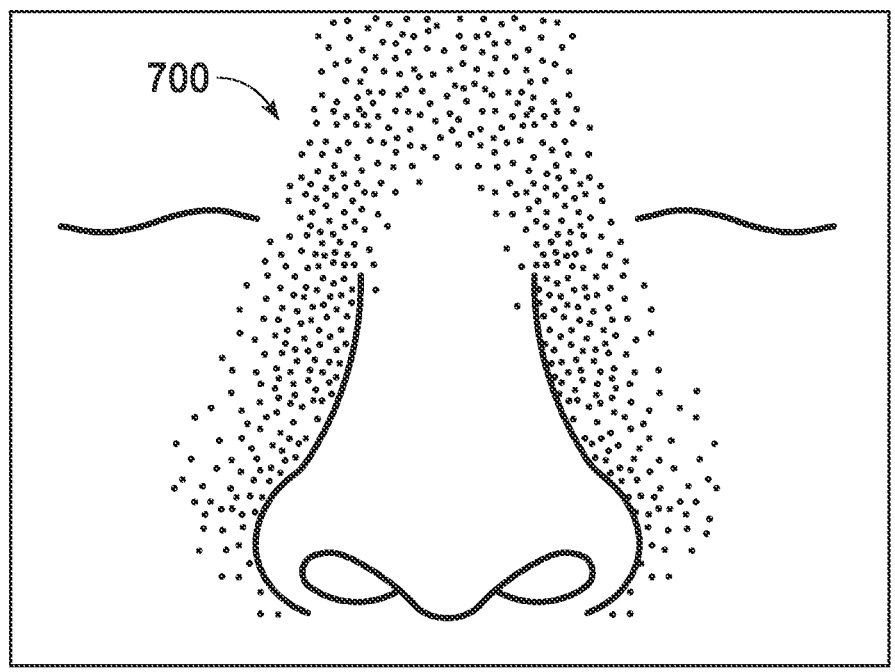
FIG. 8 illustrates microstructure locations generated by the grooming processor and depicted as dots on the outer surface of the initial skin.
Figure 11:
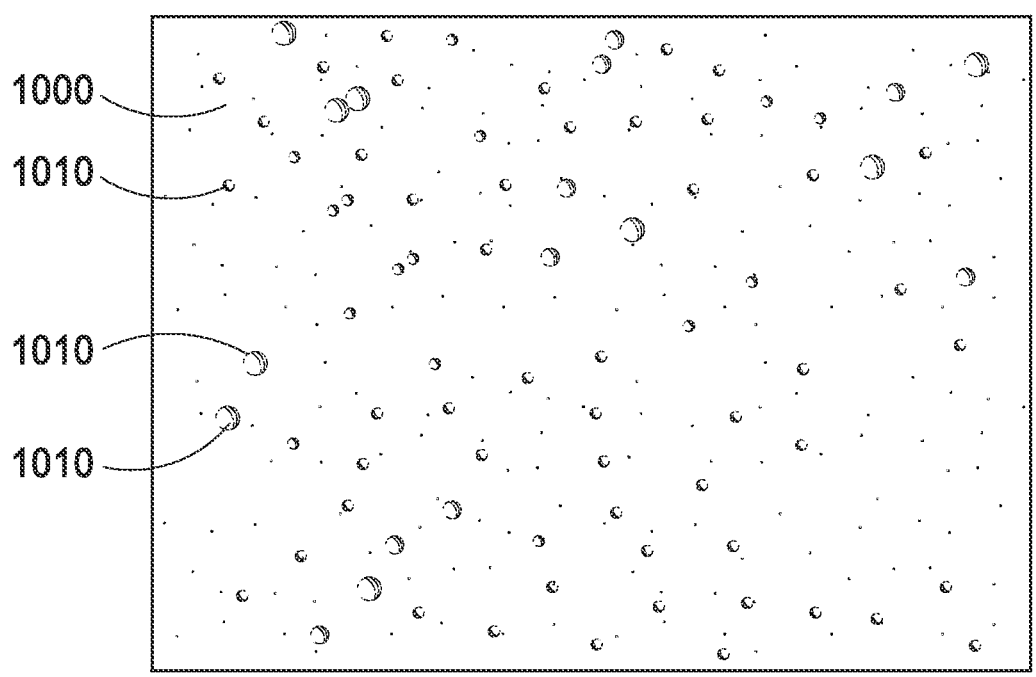
FIG. 11 illustrates a blended or smoothed version of the adaptive mesh that defines an outer surface of an intermediate skin with procedural microstructures.
Figure 12:
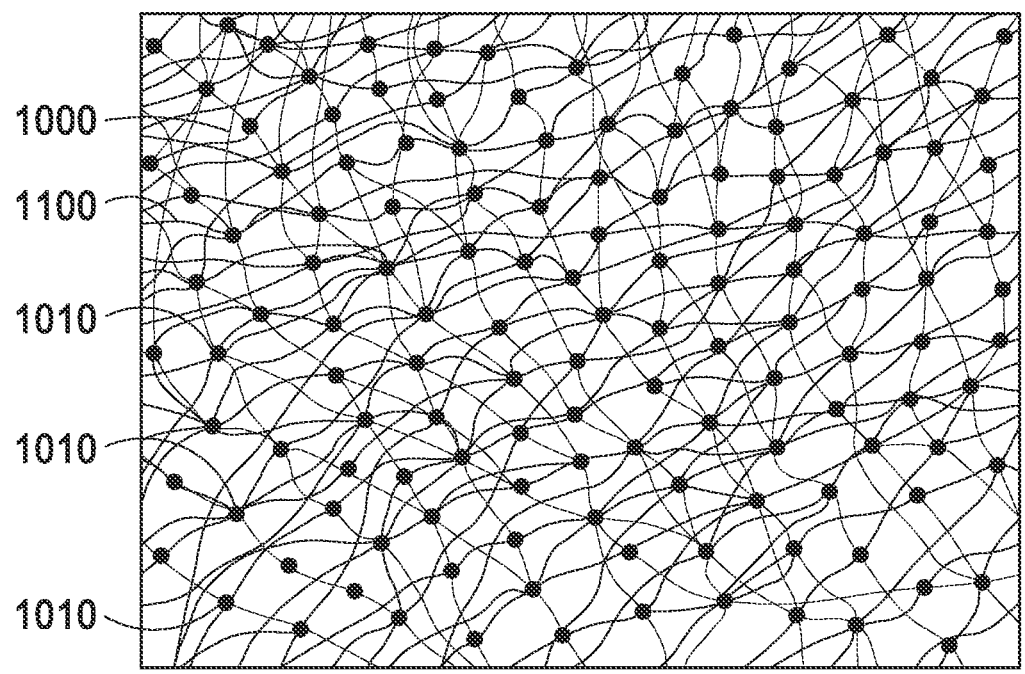
FIG. 12 illustrates curved lines drawn by the grooming processor that connect each of the procedural microstructures to its nearby neighbors.
Figure 13:
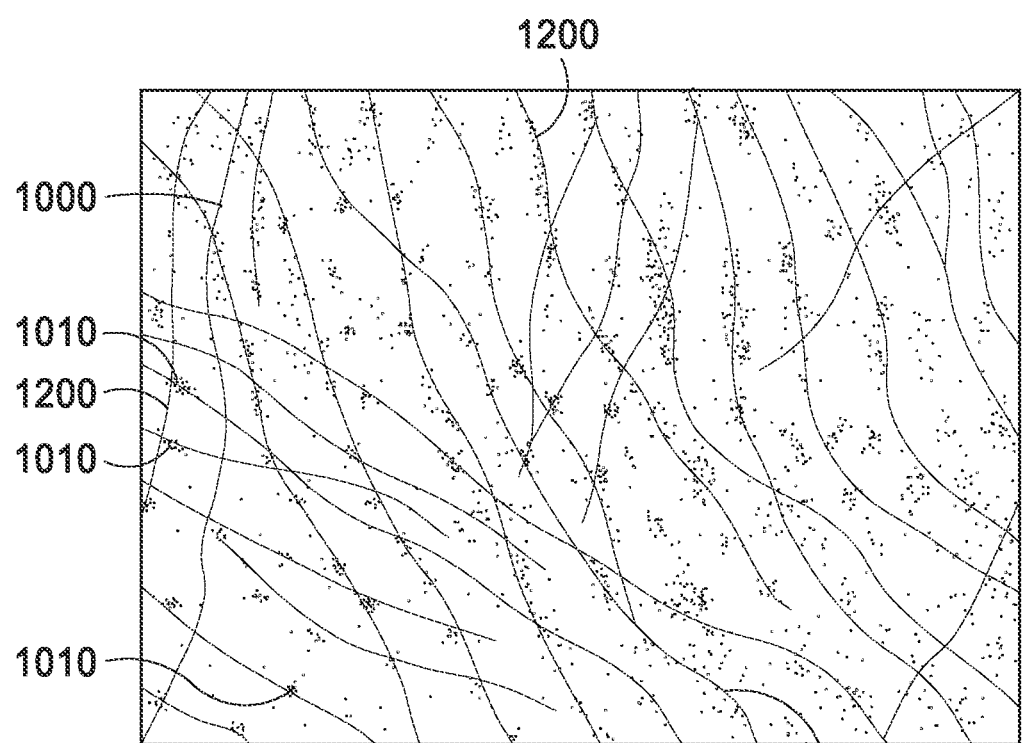
FIG. 13 illustrates micro-wrinkles or furrows generated by the grooming processor based on the curved lines interconnecting the procedural microstructures.

At step 225 (see FIG. 2), grooming processor 110 generates microstructure locations 700 (see FIGS. 8 and 9) for procedural microstructures 1010 (see FIGS. 11-13). In FIGS. 8 and 9, microstructure locations 700 are illustrated as dots on outer surface 310 (see FIG. 4) of the initial skin. Microstructure locations 700 may be determined based, at least in part, on microstructure parameter values 154 (see FIG. 1). Alternatively, one or more machine learning techniques may be used to determine microstructure locations 700 (see FIGS. 8 and 9). Grooming processor 110 may automatically generate all of microstructure locations 700 (see FIGS. 8 and 9) for procedural microstructures 1010 (see FIGS. 11-13). Optionally, referring to FIG. 1, grooming processor 110 may be configured to allow artist 142 to manually determine at least some of the locations of one or more of procedural microstructures 1010 (see FIGS. 11-13). Such locations may be stored in microstructure parameter values 154.

Referring to FIG. 2, in a next step 230, grooming processor 110 (see FIG. 1) performs an adaptive tessellation process that generates adaptive mesh 900 (see FIG. 10) which replaces initial mesh 400 (see FIGS. 5 and 10). Referring to FIGS. 8 and 9, the adaptive tessellation process responds to microstructure locations 700 and generates adaptive mesh 900 (see FIG. 10), which includes procedural microstructures 1010 (see FIGS. 11-13). As explained above, referring to FIG. 10, adaptive mesh 900 includes a larger number of polygons than initial mesh 400. Adaptive mesh 900 allows procedural microstructures 1010 (see FIGS. 11-13) to be displayed as 3D topological features formed in outer surface 1000 (see FIGS. 11-13) of the intermediate skin. Referring to FIG. 11, procedural microstructures 1010 may have different appearances based on microstructure parameter values 154 (see FIG. 1). For example, procedural microstructures 1010 may be defined as openings, they may be defined as bumps, they may follow flows 600 (see FIG. 7), and the like. In some embodiments, grooming processor 110 is configured to vary those of microstructure parameter values 154 used to generate procedural microstructures 1010 (see FIGS. 11-13) in different areas of the face. Thus, procedural microstructures 1010 (see FIGS. 11-13) may have different appearances in different areas of the face. Final shapes of procedural microstructures 1010 may be determined or inferred, at least in part, by a tension simulation process that uses the well-known finite-element method. Methods of implementing such tension simulation processes are well known and will not be described in detail.

At step 235 (see FIG. 2), grooming processor 110 (see FIG. 1) connects each of procedural microstructures 1010 to its nearby neighbors with curved lines 1100 (see FIG. 12) and includes corresponding data structures into the coarse grooming geometry. As shown in FIG. 12, curved lines 1100 form a connect-the-dot type pattern along outer surface 1000 of the intermediate skin. Grooming processor 110 (see FIG. 1) may generate curved lines 1100 based, at least in part, on the topology of outer surface 1000 of the intermediate skin, which is determined, at least in part, by geometric model 150 (see FIGS. 1 and 4). Alternatively, or additionally, curved lines 1100 may follow flows 600 (see FIG. 7). However, one or more of curved lines 1100 may be rearranged and/or redrawn manually by artist 142 (see FIG. 1) if desired. For example, artist 142 may manually specify directions for curved lines 1100 to follow. This may be particularly useful when the character is a synthetic representation of a living person. For example, if the living person has features like moles, scars, and/or deep wrinkles, manual adjustment may be necessary to reproduce the person's face accurately. Data representing the curved lines might be added to a data structure representing the coarse grooming geometry.

Next, at step 240 (see FIG. 2), grooming processor 110 (see FIG. 1) uses curved lines 1100 to generate micro-wrinkles or furrows 1200 (see FIG. 13) and includes corresponding data structures into the coarse grooming geometry. Data representing the micro-wrinkles or furrows might be added to a data structure representing the coarse grooming geometry.

Referring to FIG. 2, at step 245, grooming processor 110 (see FIG. 1) determines whether artist 142 (see FIG. 1) has indicated that artist 142 would like to modify the appearance of the one or more of the microstructures, such as procedural microstructures 1010 (see FIGS. 11-13) and/or furrows 1200 (see FIG. 13). The decision of step 245 results in "YES" when grooming processor 110 receives an indication from artist 142 that artist 142 would like to modify at least one of the microstructures. Otherwise, the decision of step 245 results in "NO."

At step 245, if the decision is "YES," grooming processor 110 (see FIG. 1) returns to step 220 and receives one or more new values for microstructure parameter values 154 (see FIG. 1). For example, artist 142 (see FIG. 1) may change one or more values that effect the orientation of flows 600 (see FIG. 7), which will change appearance of furrows 1200 (see FIG. 13).

At step 245, if the decision is "NO," coarse grooming geometry 160 (see FIG. 1) is deemed to be defined. As mentioned above, referring to FIG. 1, coarse grooming geometry 160 includes adaptive mesh 900 (see FIG. 10), information defining the microstructures (e.g., microstructure parameter values 154), geometric model 150, and textures 152. Microstructure parameter values 154 may include microstructure locations 700 (see FIGS. 8 and 9), curved lines 1100 (see FIG. 11), and/or flows 600 (see FIG. 7). Additionally, the information defining the microstructures may define the internal structure(s) of the skin below outer surface 1000 (see FIG. 11) of the intermediate skin. For example, the information may define a depth of each of the microstructures. At step 250 (see FIG. 2), grooming processor 110 transmits coarse grooming geometry 160 to mesh modeler 120.

At step 255 (see FIG. 2), mesh modeler 120 generates volumetric mesh 162 based, at least in part, on coarse grooming geometry 160. Volumetric mesh 162 includes the microstructures and is configured to be applied on top of geometric model 150. Alternatively, the volumetric mesh—once applied—might be used instead of the geometric model.

The resolution of volumetric mesh 162 can be based, at least in part, on the density and/or number of procedural microstructures 1010 (see FIGS. 11-13). The depth of microstructures as indicated by one or more of microstructure parameter values 154 and/or adaptive mesh 900 (see FIG. 10) may determine, at least in part, the depth or thickness of volumetric mesh 162, which may be non-uniform. Because volumetric mesh 162 is procedurally generated (meaning volumetric mesh 162 is not modeled by hand), it may be optimized for simulation as a byproduct. For example, simulating the microstructures requires a high enough resolution to represent change(s) in curvature under tension and a low enough resolution to avoid negatively affecting computational cost (or demands) of the simulation. In other words, volumetric mesh 162 may be generated with a resolution optimized to balance computational costs with a need to display change(s) in curvature under tension. The resolution of volumetric mesh 162 determines, at least in part, the geometry of volumetric mesh 162. Thus, procedural modeling may be used to optimize geometry for finite-element simulation of the microstructures.

At step 260 (see FIG. 2), mesh modeler 120 combines volumetric mesh 162, geometric model 150, and textures 152 together and generates a displacement signal representing the skin and sends the displacement signal to at least one of animation pipeline(s) 130.

At step 265 (see FIG. 2), animation pipeline(s) 130 will perform a final render operation and generate the synthetic skin for the character. As mentioned above, animation pipeline(s) 130 may generate static image(s) 170 and/or animated video(s) 172 that include visual representations of the 3D computer-animated character with the computer-animated skin created by applying volumetric mesh 162 and textures 152 to geometric model 150. In other words, animation pipeline(s) 130 may apply textures 152 to volumetric mesh 162, which is covering geometric model 150. Then, process 200 (see FIG. 2) terminates.

In some embodiments, coarse grooming geometry 160 may be sent directly to animation pipeline(s) 130, which then can generate volumetric mesh 162. In such embodiments, step 255 (see FIG. 2) may be omitted.

Optionally, referring to FIG. 1, some features (e.g., deep wrinkles) may be painted into one or more of textures 152 and applied to specific regions of volumetric mesh 162 over any microstructures generated for those specific regions by process 200 (see FIG. 2) to give artist 142 control over those specific regions of the skin. For example, some microstructures may be hand placed onto volumetric mesh 162 using one or more of textures 152. This provides regional control of the microstructures where desired. Microstructure parameter values 154 may identify one or more of textures 152 to be painted over the microstructures generated for one or more specific areas of volumetric mesh 162.

Figure 3:
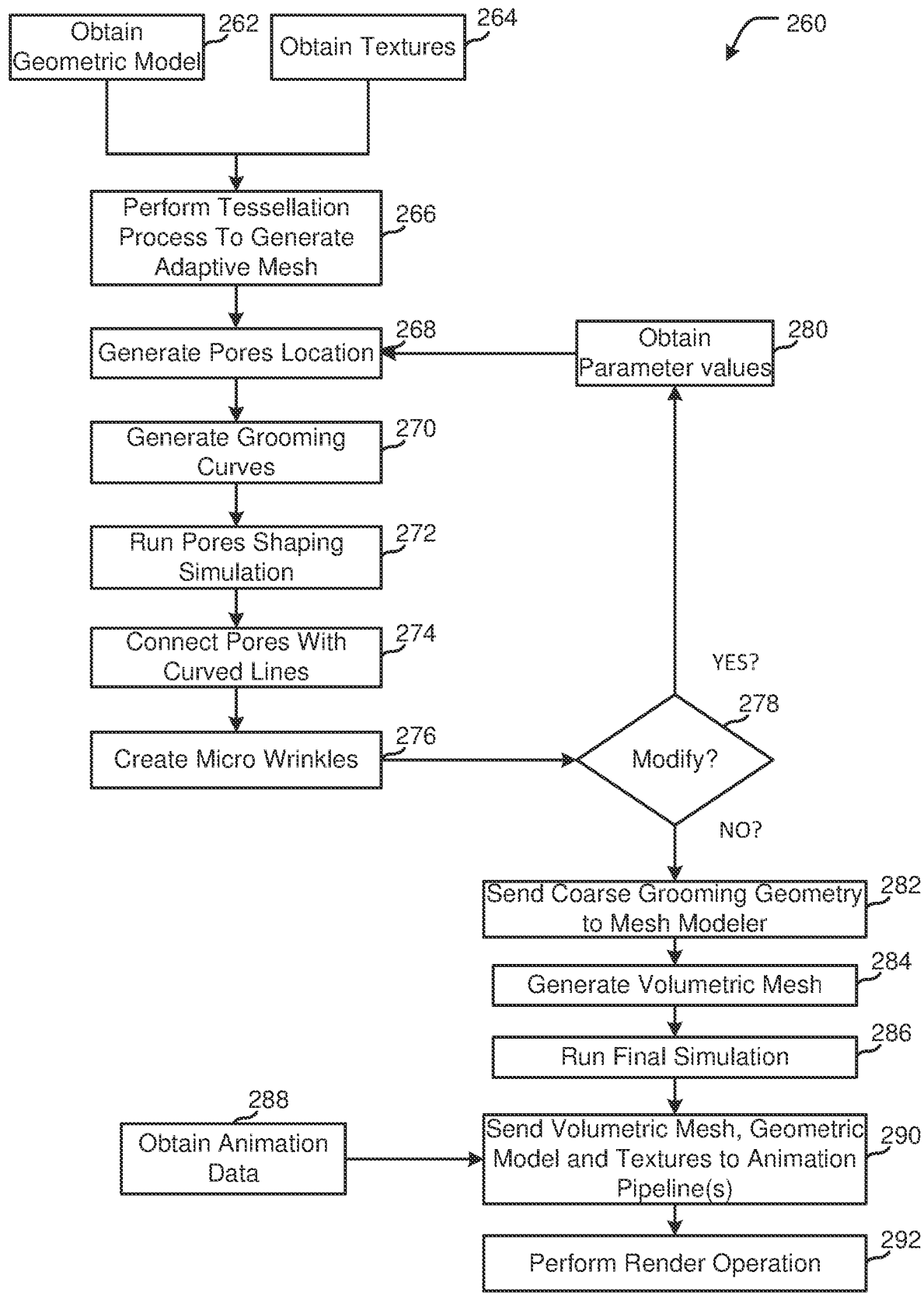
FIG. 3 is a flowchart of an alternative process of generating computer-animated skin for a three-dimensional ("3D") computer-animated character.

FIG. 3 is a flowchart of a process of more detail of step 260 of FIG. 2 in another variation that may be executed by system 100 of FIG. 1 and used to generate computer-animated skin for the 3D computer-animated character. Referring to FIG. 3, in a first step 262, grooming processor 110 (see FIG. 1) obtains geometric model 150 (see FIG. 1). As mentioned above, geometric model 150 is covered by initial mesh 400 (see FIGS. 5 and 10), which may be blended or smoothed to define outer surface 310 (see FIG. 4) of the initial skin that may lack any microstructure. Next, at step 264, grooming processor 110 obtains textures 152 (see FIG. 1) and optionally applies them to outer surface 310 (see FIG. 4) of the initial skin.

Then, at step 266, grooming processor 110 performs a tessellation process on the geometric model to generate an adaptive mesh. Processes other than tessellation might be used instead.

Data structures representing an adaptive mesh, stored by grooming processor 110 or otherwise, might include data corresponding to vertices in a 3D coordinate space, edges connecting vertices (perhaps each edge connecting two vertices), and thus possibly defining polygonal faces, such as triangles and/or polygons of more than three sides. Data structures might be stored with face details, such as positions, vertices, normals, etc., or that might be derived from vertex and edge data. Other data structures stored related to the adaptive mesh might include data for a depth value at a plurality of points on the adaptive mesh, such as at vertices or faces or edges. A depth value might represent a thickness to be inferred for the adaptive mesh at the depth value's respective location on the adaptive mesh. As such, the adaptive mesh might be used to define an overlay onto a geometric model wherein a surface is defined as if the adaptive mesh, and its specified thickness/depth at each such point, is applied as an object onto the geometric model to form a mesh surface that, at each such point, is distant from the geometric model by a distance corresponding to the depth value at such a point.

At step 268 (see FIG. 3), grooming processor 110 generates microstructure locations for procedural microstructures. The microstructure locations may be determined based, at least in part, on microstructure parameter values. Alternatively, one or more machine learning techniques may be used to determine the microstructure locations. Grooming processor 110 may automatically generate all of the microstructure locations for procedural microstructures. Optionally, referring to FIG. 1, grooming processor 110 may be configured to allow artist 142 to manually determine the location of one or more of the procedural microstructures. Such locations may be stored as microstructure parameter values.

The adaptive tessellation process can respond to microstructure locations and generate the adaptive mesh, which includes procedural microstructures. The adaptive mesh might include a larger number of polygons than the initial mesh. The adaptive mesh might allow procedural microstructures to be displayed as 3D topological features formed in the outer surface of an intermediate skin.

At step 270, grooming processor 110 might generate grooming curves. A grooming curve might represent a connection of procedural microstructures to its nearby neighbors and includes corresponding data structures into the coarse grooming geometry. In some variations, perhaps artist-selectable, what constitutes a "nearby neighbor" might be variable. For example, it might be that only microstructures within a limited distance are considered nearby neighbors, or only some fixed number of whatever microstructures are closest are considered. It might be noted that features, processes, elements and steps described herein with reference to microstructures and microstructure operations might also be applied to other microstructures. Applications might be to microstructures such as scars, pimples, moles, follicles, or other structures where procedural generation of microstructures might be useful and improve computer processing time/resources/efforts and/or simplify a user interface used to input details of such microstructures. For example, if hundreds of microstructures could be placed procedurally such that their use provides acceptable output imagery, that might eliminate the need for a long and tedious manual microstructure entry/specification process.

grooming processor 110 might generate curved lines based, at least in part, on the topology of the outer surface of the intermediate skin, which can be determined, at least in part, by geometric model 150. Alternatively, or additionally, the curved lines may follow the flows. However, one or more of the curved lines may be rearranged and/or redrawn manually by the artist if desired. For example, the artist may manually specify directions for the curved lines to follow. This may be particularly useful when the character is a synthetic representation of a living person. For example, if the living person has features like moles, scars, and/or deep wrinkles, manual adjustment may be necessary to reproduce the person's face accurately. Data representing the curved lines might be added to a data structure representing the coarse grooming geometry.

Next, at step 272, grooming processor 110 might run a microstructure shaping simulation from the grooming curves. Using an output of the microstructure shaping simulation, grooming processor 110 might connect microstructures with curved lines at step 274 and then at step 276, use the curved lines to generate micro-wrinkles or furrows and include corresponding data structures into the coarse grooming geometry. Data representing the micro-wrinkles or furrows might be added to a data structure representing the coarse grooming geometry.

At step 278, grooming processor 110 determines whether artist 142 has indicated that artist 142 would like to modify the appearance of the one or more of the microstructures, such as the procedural microstructures and/or the furrows. The decision in step 278 is "YES" when grooming processor 110 receives an indication from artist 142 that artist 142 would like to modify at least one detail. Otherwise, the decision is "NO."

If the decision is "YES," grooming processor 110 returns to step 280 and receives one or more new values for microstructure parameter values. For example, artist 142 may change one or more values that effect the orientation of the flows, which will change the appearance of furrows.

If the decision is "NO," the coarse grooming geometry is deemed to have been defined. As mentioned above, the coarse grooming geometry can include the adaptive mesh, information defining microstructures (e.g., microstructure parameter values), a geometric model, and textures. The microstructure parameter values may include microstructure locations, curved lines, and/or flows. Additionally, the information defining the microstructures may define the internal structure(s) of the skin below the outer surface of the intermediate skin. For example, the information may define a depth of each of the microstructures.

At step 282, grooming processor 110 transmits the coarse grooming geometry to a mesh modeler.

At step 284, the mesh modeler generates a volumetric mesh based, at least in part, on the coarse grooming geometry. The volumetric mesh includes the microstructures and is configured to be applied on top of a geometric model. The resolution of the volumetric mesh can be based, at least in part, on the density and/or number of the procedural microstructures. The depth of microstructures as indicated by one or more of the microstructure parameter values and/or the adaptive mesh may determine, at least in part, the depth or thickness of the volumetric mesh, which may be non-uniform. Because the volumetric mesh might be procedurally generated (meaning the volumetric mesh need not be modeled by hand), it may be optimized for simulation as a byproduct. For example, simulating the microstructures requires a high enough resolution to represent change(s) in curvature under tension and a low enough resolution to avoid negatively affecting computational cost (or demands) of the simulation. In other words, the volumetric mesh may be generated with a resolution optimized to balance computational costs with a need to display change(s) in curvature under tension. The resolution of the volumetric mesh determines, at least in part, the geometry of the volumetric mesh. Thus, procedural modeling may be used to optimize geometry for finite-element simulation of the microstructures.

At step 286, a final simulation is run.

At step 290, the mesh modeler combines the volumetric mesh, the geometric model, and the textures together and generates a displacement signal representing the skin and sends the displacement signal to at least one animation pipeline.

At step 292, the animation pipeline performs a final render operation and generates the synthetic skin for the character after obtaining animation data at step 288. As mentioned above, the animation pipeline may generate static image(s) and/or the animated video(s) that include visual representations of the 3D computer-animated character with the computer-animated skin created by applying the volumetric mesh and the textures to the geometric model. In other words, the animation pipeline may apply the textures to the volumetric mesh, which is covering the geometric model. Then, the process terminates.

In some embodiments, the coarse grooming geometry may be sent directly to the animation pipeline, which then can generate the volumetric mesh. In such embodiments, step 284 may be omitted.

Optionally, referring to FIG. 1, some features (e.g., deep wrinkles) may be painted into one or more of textures 152 and applied to specific regions of volumetric mesh 162 over any microstructures generated for those specific regions by process 200 or step 260 (see FIG. 3) to give artist 142 control over those specific regions of the skin. For example, some microstructures may be hand placed onto volumetric mesh 162 using one or more of textures 152. This provides regional control of the microstructures where desired. Microstructure parameter values 154 may identify one or more of textures 152 to be painted over the microstructures generated for one or more specific areas of volumetric mesh 162.

In some embodiments, the coarse grooming geometry can be generated, in part, by a procedural method and eliminate the need for an artist to insert details manually and reinsert elements as details of a scene change.

Figure 14:
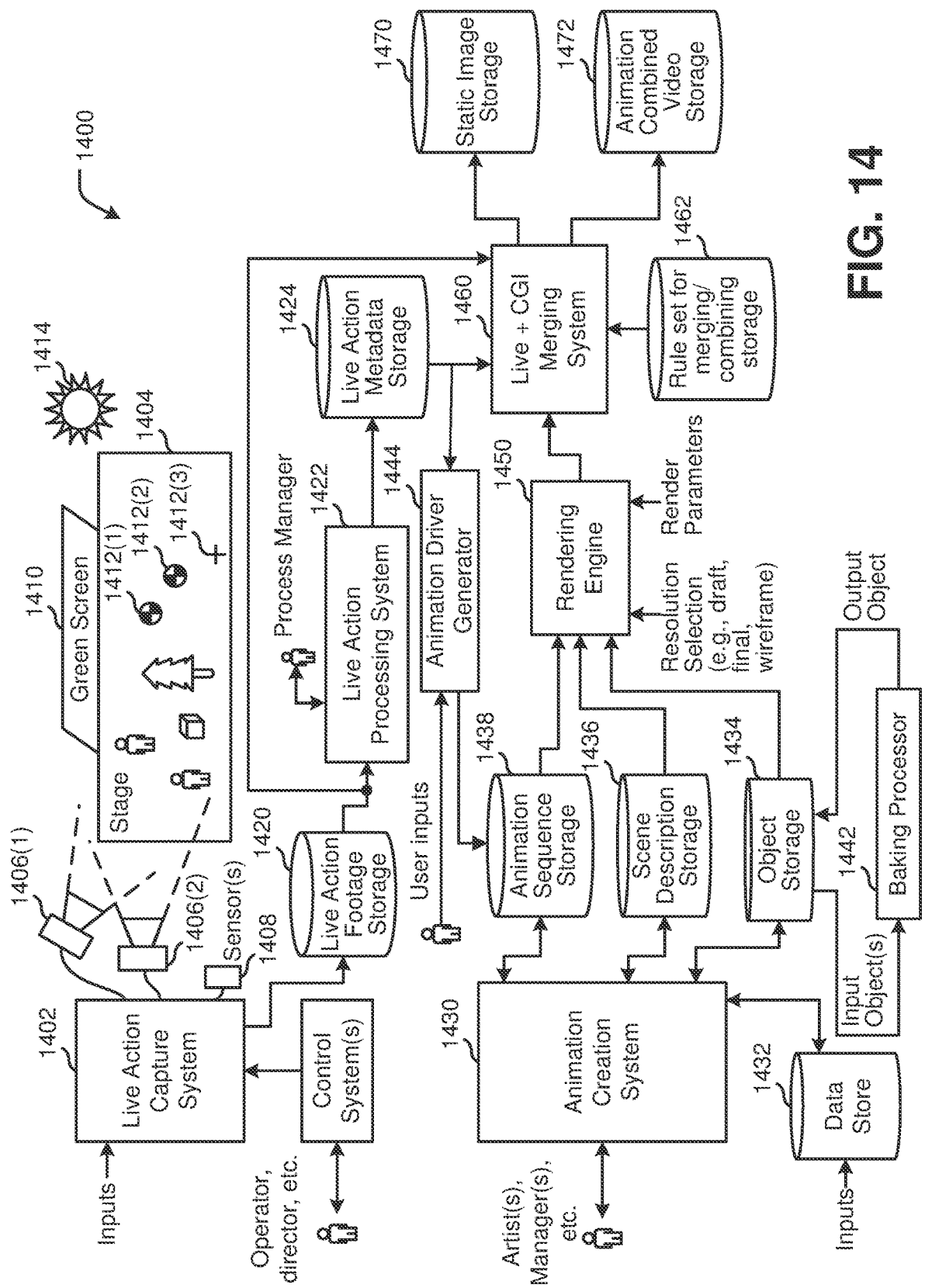
FIG. 14 illustrates an example visual content generation system as might be used to generate imagery in the form of still images and/or video sequences of images.

For example, FIG. 14 illustrates the example visual content generation system 1400 as might be used to generate imagery in the form of still images and/or video sequences of images. Visual content generation system 1400 might generate imagery of live action scenes, computer generated scenes, or a combination thereof. In a practical system, users are provided with tools that allow them to specify, at high levels and low levels where necessary, what is to go into that imagery. For example, a user might be an animation artist (like artist 142 illustrated in FIG. 1) and might use visual content generation system 1400 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1400 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., artist 142 illustrated in FIG. 1) might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 14, a live action capture system 1402 captures a live scene that plays out on a stage 1404. Live action capture system 1402 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1406(1) and 1406(2) capture the scene, while in some systems, there might be other sensor(s) 1408 that capture information from the live scene (e.g., infrared cameras, infrared sensors, motion capture ("mo-cap") detectors, etc.). On stage 1404, there might be human actors, animal actors, inanimate objects, background objects, and possibly an object such as a green screen 1410 that is designed to be captured in a live scene recording in such a way that it is easily overlaid with computer-generated imagery. Stage 1404 might also contain objects that serve as fiducials, such as fiducials 1412(1)-(3), that might be used post-capture to determine where an object was during capture. A live action scene might be illuminated by one or more lights, such as an overhead light 1414.

During or following the capture of a live action scene, live action capture system 1402 might output live action footage to a live action footage storage 1420. A live action processing system 1422 might process live action footage to generate data about that live action footage and store that data into a live action metadata storage 1424. Live action processing system 1422 might include computer processing capabilities, image processing capabilities, one or more processors, program code storage for storing program instructions executable by the one or more processors, as well as user input devices and user output devices, not all of which are shown. Live action processing system 1422 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1414, as that might be useful in post-processing to match computer-generated lighting on objects that are computer-generated and overlaid on the live action footage. Live action processing system 1422 might operate autonomously, perhaps based on predetermined program instructions, to generate and output the live action metadata upon receiving and inputting the live action footage. The live action footage can be camera-captured data as well as data from other sensors.

An animation creation system 1430 is another part of visual content generation system 1400. Animation creation system 1430 might include computer processing capabilities, image processing capabilities, one or more processors, program code storage for storing program instructions executable by the one or more processors, as well as user input devices and user output devices, not all of which are shown. Animation creation system 1430 might be used by animation artists, managers, and others to specify details, perhaps programmatically and/or interactively, of imagery to be generated. From user input and data from a database or other data source, indicated as a data store 1432, animation creation system 1430 might generate and output data representing objects (e.g., a horse, a human, a ball, a teapot, a cloud, a light source, a texture, etc.) to an object storage 1434, generate and output data representing a scene into a scene description storage 1436, and/or generate and output data representing animation sequences to an animation sequence storage 1438.

Scene data might indicate locations of objects and other visual elements, values of their parameters, lighting, camera location, camera view plane, and other details that a rendering engine 1450 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1430 might be interactive, allowing a user to read in animation sequences, scene descriptions, object details, etc. and edit those, possibly returning them to storage to update or replace existing data. As an example, an operator might read in objects from object storage into a baking processor 1442 that would transform those objects into simpler forms and return those to object storage 1434 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1432 might be used to drive object presentation. For example, if an artist is creating an animation of a spaceship passing over the surface of the Earth, instead of manually drawing or specifying a coastline, the artist might specify that animation creation system 1430 is to read data from data store 1432 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1444 might read in live action metadata, such as data representing movements and positions of body parts of a live actor during a live action scene. Animation driver generator 1444 might generate corresponding animation parameters to be stored in animation sequence storage 1438 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1422. Animation driver generator 1444 might convert that movement data into specifications of how joints of an articulated CGI character are to move over time.

A rendering engine 1450 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1450 might include computer processing capabilities, image processing capabilities, one or more processors, program code storage for storing program instructions executable by the one or more processors, as well as user input devices and user output devices, not all of which are shown.

Visual content generation system 1400 can also include a merging system 1460 that merges live footage with animated content. The live footage might be obtained and input by reading from live action footage storage 1420 to obtain live action footage, by reading from live action metadata storage 1424 to obtain details such as presumed segmentation in captured images segmenting objects in a live action scene from their background (perhaps aided by the fact that green screen 1410 was part of the live action scene), and by obtaining CGI imagery from rendering engine 1450.

A merging system 1460 might also read data from rulesets for merging/combining storage 1462. A very simple example of a rule in a ruleset might be "obtain a full image including a two-dimensional pixel array from live footage, obtain a full image including a two-dimensional pixel array from rendering engine 1450, and output an image where each pixel is a corresponding pixel from rendering engine 1450 when the corresponding pixel in the live footage is a specific color of green, otherwise output a pixel value from the corresponding pixel in the live footage."

Merging system 1460 might include computer processing capabilities, image processing capabilities, one or more processors, program code storage for storing program instructions executable by the one or more processors, as well as user input devices and user output devices, not all of which are shown. Merging system 1460 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1460, such as modifying boundaries of segmented objects, inserting blurs to smooth out imperfections, or adding other effects. Based on its inputs, merging system 1460 can output an image to be stored in a static image storage 1470 and/or a sequence of images in the form of video to be stored in an animated/combined video storage 1472.

Thus, as described, visual content generation system 1400 can be used to generate video that combines live action with computer-generated animation using various components and tools, some of which are described in more detail herein. While visual content generation system 1400 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 15:
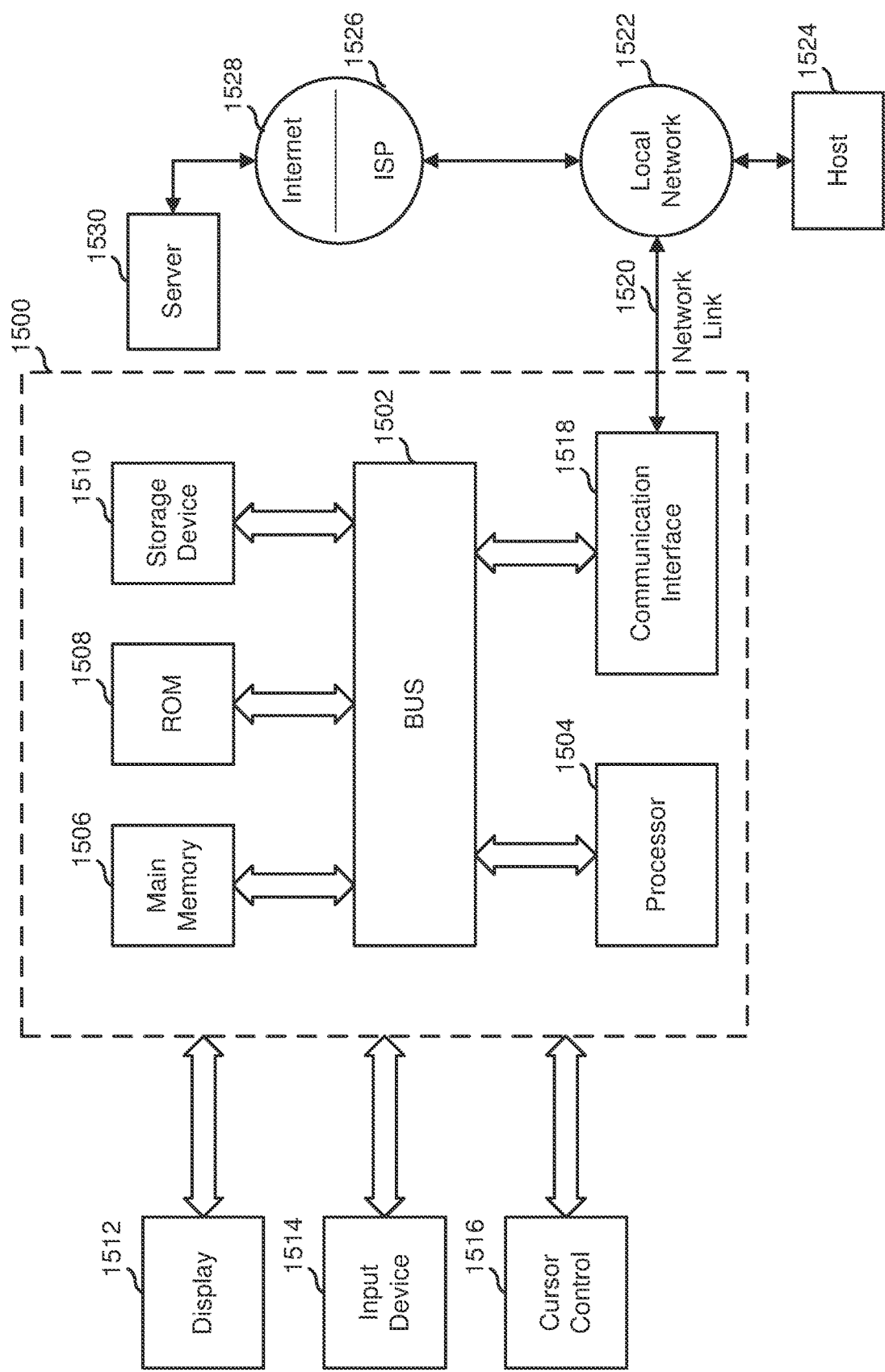
FIG. 15 is a block diagram illustrating a computer system upon which computer systems of the system illustrated in FIGS. 1 and 14 may be implemented.

For example, FIG. 15 is a block diagram that illustrates a computer system 1500 upon which the computer systems of the systems described herein and/or visual content generation system 1400 (see FIG. 14) may be implemented. Computer system 1500 includes a bus 1502 or other communication mechanism for communicating information, and a processor 1504 coupled with bus 1502 for processing information. Processor 1504 may be, for example, a general-purpose microprocessor.

Computer system 1500 also includes a main memory 1506, such as a random-access memory (RAM) or other dynamic storage device, coupled to bus 1502 for storing information and instructions to be executed by processor 1504. Main memory 1506 may also be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a computer monitor, for displaying information to a computer user. An input device 1514, including alphanumeric and other keys, is coupled to bus 1502 for communicating information and command selections to processor 1504. Another type of user input device is a cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a network connection. A modem or network interface local to computer system 1500 can receive the data. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be a network card, a modem, a cable modem, or a satellite modem to provide a data communication connection to a corresponding type of telephone line or communications line. Wireless links may also be implemented. In any such implementation, communication interface 1518 sends and receives electrical, electromagnetic, or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world-wide packet data communication network now commonly referred to as the "Internet" 1528. Local network 1522 and Internet 1528 both use electrical, electromagnetic, or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520, and communication interface 1518. In the Internet example, a server 1530 might transmit a requested code for an application program through the Internet 1528, ISP 1526, local network 1522, and communication interface 1518. The received code may be executed by processor 1504 as it is received, and/or stored in storage device 1510, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of modeling, the method comprising:
   under the control of one or more computer systems configured with executable instructions:
      performing at least one procedural microstructure modeling process, wherein a procedural microstructure modeling process computes a plurality of microstructures for a geometric model, and wherein a microstructure of the plurality of microstructures is represented by a microstructure data object that includes a reference to a microstructure location relative to the geometric model that indicates where on the geometric model that microstructure is to be displayed;
      determining a volumetric mesh resolution based, at least in part, on microstructure locations of microstructures of the plurality of microstructures; and
      generating a volumetric mesh from the geometric model and the plurality of microstructures, the volumetric mesh representing an outer surface of the geometric model, wherein the outer surface incorporates the plurality of microstructures.

2. The computer-implemented method of claim 1, wherein the at least one procedural microstructure modeling process defines the plurality of microstructures based, at least in part, on user-defined microstructure parameter values.

3. The computer-implemented method of claim 1, further comprising:
   defining furrows that interconnect neighboring ones of the plurality of microstructures; and
   incorporating data corresponding to the furrows into the volumetric mesh.

4. The computer-implemented method of claim 3, further comprising:
   defining flows along the geometric model, at least one of the microstructure locations, a first appearance of the plurality of microstructures, and a second appearance of the furrows being determined based, at least in part, on the flows.

5. The computer-implemented method of claim 1, further comprising:
   defining flows along the geometric model, at least one of the microstructure locations and an appearance of the plurality of microstructures being based, at least in part, on the flows;
   obtaining a texture data structure, the texture data structure representing color information for the geometric model; and
   adjusting the volumetric mesh based on the texture data structure.

6. The computer-implemented method of claim 1, wherein the geometric model depicts an animated character, and the outer surface is skin covering the geometric model of the animated character.

7. A computer-implemented method of modeling a character surface, the method comprising:
   under the control of one or more computer systems configured with executable instructions:
      obtaining a geometric model of at least a portion of a character, the geometric model comprising an initial mesh defined by a first number of polygons;
      obtaining a set of microstructure parameter values;
      generating a set of microstructure locations for a plurality of microstructures, based, at least in part, on a first subset of the set of microstructure parameter values, wherein a second number of microstructures is greater than a third number of parameter values in the set of microstructure parameter values;
      generating an intermediate mesh corresponding to the set of microstructure locations and the plurality of microstructures, wherein the intermediate mesh comprises a fourth number of polygons greater than the first number of polygons, the fourth number of polygons being determined, at least in part, by the set of microstructure locations, wherein the intermediate mesh is based, at least in part, on a second subset of the set microstructure parameter values; and
      generating a volumetric mesh comprising the microstructures from the intermediate mesh, wherein the volumetric mesh represents a merger of the initial mesh and the intermediate mesh and wherein the volumetric mesh corresponds to the character surface and is usable as a representative of the character surface having the plurality of microstructures incorporated therein.

8. The computer-implemented method of claim 7, wherein the fourth number of polygons is based, at least in part, on the set of microstructure locations.

9. The computer-implemented method of claim 7, wherein a microstructure appearance of the set of microstructures is based, at least in part, on a second set of the microstructure parameter values.

10. The computer-implemented method of claim 7, further comprising:
    generating furrows interconnecting neighboring ones of the microstructures, a furrows appearance of the furrows being based, at least in part, on a third set of the microstructure parameter values, the volumetric mesh comprising the furrows.

11. The computer-implemented method of claim 7, further comprising:
    defining flows along the initial mesh, at least one of the microstructure locations and one microstructure appearance of being based, at least in part, on the flows;
    obtaining textures including color information; and
    applying the textures to the volumetric mesh.

12. A system, comprising:
- at least one first computing device configured to implement a grooming processor configured to receive a first data structure representing a three-dimensional geometric model and a second data structure representing microstructure parameter values, wherein the at least one first computing device is further configured to generate microstructure locations based, at least in part, on a first portion of the second data structure, and generate an adaptive mesh that represents microstructures located at the microstructure locations;
- at least one second computing device configured to implement a mesh modeler usable for generating a volumetric mesh based on coarse grooming geometry, the volumetric mesh being configured to form a surface of the three-dimensional geometric model; and
- a communication channel between the at least one first computing device and the at least one second computing device usable for sending the coarse grooming geometry to the mesh modeler, wherein the coarse grooming geometry comprises the adaptive mesh, the three-dimensional geometric model, and a second set of the microstructure parameter values.

13. The system of claim 12, further comprising:
- at least one third computing device configured to implement an animation pipeline, the mesh modeler being configured to send a displacement signal to the animation pipeline, the displacement signal comprising the volumetric mesh and the three-dimensional geometric model, the animation pipeline being configured to generate at least one animated image of the three-dimensional geometric model covered by the volumetric mesh.

14. The system of claim 13, wherein the grooming processor is configured to receive textures and include the textures in the coarse grooming geometry, the mesh modeler is configured to include the textures in the displacement signal, and the animation pipeline is configured to apply the textures to the volumetric mesh.

15. The system of claim 12, wherein the three-dimensional geometric model comprises an initial mesh defining an initial skin, and the grooming processor obtains textures and applies the textures to an outer surface of the initial skin.

16. The system of claim 12, wherein an appearance of the microstructures is based, at least in part, on a third set of the microstructure parameter values.

17. The system of claim 12, wherein the three-dimensional geometric model comprises an initial mesh defined by a first number of polygons, the adaptive mesh comprises a second number of polygons, and the second number of polygons is greater than the first number of polygons.

18. The system of claim 12, wherein the grooming processor is configured to generate furrows interconnecting neighboring ones of the microstructures and include information defining the furrows in the coarse grooming geometry, and the mesh modeler is configured to include the furrows in the volumetric mesh.

19. The system of claim 18, wherein the three-dimensional geometric model comprises an initial mesh, and the grooming processor is configured to receive flows defined along the initial mesh and generate the furrows based, at least in part, on the flows.

20. The system of claim 12, wherein the three-dimensional geometric model comprises an initial mesh, wherein the grooming processor is configured to receive flows defined along the initial mesh and generate the microstructure locations based, at least in part, on the flows and is further configured to define mesh flows along the initial mesh, with an appearance of the microstructures generated by the grooming processor being based, at least in part, on the mesh flows.

* * * * *